(12) United States Patent
Tarui

(10) Patent No.: US 12,474,696 B2
(45) Date of Patent: Nov. 18, 2025

(54) MACHINE TOOL SYSTEM

(71) Applicant: FANUC CORPORATION, Yamanashi (JP)

(72) Inventor: Yoshihiko Tarui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 345 days.

(21) Appl. No.: 18/013,441

(22) PCT Filed: Jul. 9, 2021

(86) PCT No.: PCT/JP2021/025878
§ 371 (c)(1),
(2) Date: Dec. 28, 2022

(87) PCT Pub. No.: WO2022/014476
PCT Pub. Date: Jan. 20, 2022

(65) Prior Publication Data
US 2023/0297087 A1    Sep. 21, 2023

(30) Foreign Application Priority Data

Jul. 14, 2020   (JP) ................................. 2020-120586

(51) Int. Cl.
G05B 19/418    (2006.01)
(52) U.S. Cl.
CPC ... G05B 19/41865 (2013.01); G05B 19/4183 (2013.01); *G05B 2219/32266* (2013.01)
(58) Field of Classification Search
USPC ....................................................... 700/100
See application file for complete search history.

(56) References Cited

U.S. PATENT DOCUMENTS 4,473,883 A * 9/1984 Yoshida ............. G05B 19/4189
235/375
5,488,564 A * 1/1996 Ikeda ................... G05B 19/408
700/86

(Continued)

FOREIGN PATENT DOCUMENTS

CN        1746910 A      3/2006
CN      103439886 A    12/2013

(Continued)

OTHER PUBLICATIONS

CN_100580594_C (Year: 2010).*

(Continued)

*Primary Examiner* — Hien D Khuu
(74) *Attorney, Agent, or Firm* — KARCESKI IP LAW, PLLC

(57) ABSTRACT

A machine tool system includes a schedule storage unit that stores machining schedule information containing a machining sequence of a plurality of workpieces, and a priority-level setting unit that allows a user to designate any of the workpieces in the machining schedule information stored in the schedule storage unit and to set a priority level for the designated workpiece. The workpiece for which the priority level is set by the priority-level setting unit is machined in accordance with the priority level, and the workpiece for which the priority level is not set is machined in accordance with the machining sequence after the workpiece for which the priority level is set is machined.

2 Claims, 10 Drawing Sheets

(56) References Cited

U.S. PATENT DOCUMENTS

| | | | |
|---|---|---|---|
| 5,870,306 A | 2/1999 | Harada | |
| 5,914,338 A * | 6/1999 | Jeppesen | A61P 25/18 |
| | | | 548/134 |
| 6,445,972 B1 | 9/2002 | Takegahara et al. | |
| 7,460,920 B1 * | 12/2008 | Qu | G05B 19/41885 |
| | | | 700/100 |
| 2009/0138117 A1 | 5/2009 | Bagwell et al. | |
| 2015/0053529 A1 * | 2/2015 | Maseki | B65G 17/005 |
| | | | 198/346.1 |
| 2015/0142156 A1 * | 5/2015 | Maseki | G05B 15/02 |
| | | | 700/112 |
| 2019/0202017 A1 * | 7/2019 | Sagasaki | B23B 13/022 |
| 2019/0278248 A1 * | 9/2019 | Sagasaki | B23Q 15/04 |
| 2019/0375065 A1 * | 12/2019 | Sato | B23Q 11/00 |

FOREIGN PATENT DOCUMENTS

| | | |
|---|---|---|
| EP | 0939356 A2 | 9/1999 |
| GB | 2314174 A | 12/1997 |
| GB | 2329041 A | 10/1999 |
| JP | S63163904 A | 7/1988 |
| JP | H03170256 A | 7/1991 |
| JP | H05274016 A | 10/1993 |
| JP | H1039909 A | 2/1998 |
| JP | H1086040 A | 4/1998 |
| JP | H11239922 A | 9/1999 |
| JP | 2004310747 A | 11/2004 |
| JP | 2005081531 A | 3/2005 |
| WO | 2018138870 A1 | 8/2018 |

OTHER PUBLICATIONS

JP_H09153088_A (Year: 1997).*
JP_3612169_B2 (Year: 2005).*
GB_2074347_A (Year: 1981).*
DE_3620608_A1 (Year: 1987).*
JP_3483237_B2 (Year: 2004).*
EP_3543812_A1 (Year: 2019).*
International Search Report dated Oct. 5, 2021, for International Patent Application No. PCT/JP2021/025878.
Chinese Office Action dated Jan. 23, 2025, for Chinese Patent Application No. 202180035811.3.
Chinese Office Action dated May 6, 2025, for Chinese Patent Application No. 202180035811.3.
Lian Yue, et al., "Production Planning and Control in a Modular Manufacturing System", Enterprise info. Management, CAD/CAM and Manufacturing Information Technology, 2009(03), pp. 28-30, Mechanical Industry Information Research Institute, Beijing, China.
Liu Yan-li, et al., "Application of Heuristic Algorithm in Task Scheduling", Computer Technology and Development, vol. 18, No. 3, pp. 221-224, Shaanxi Provincial Computer Society Xi'an, Shaanxi Province, China.
Xue Dong-juan, et al., "Dynamic Reconfigurable ERP Based on MAS for Large-Scale Complex Equipment Industries", Journal of Hebei University (Natural Science Edition), vol. 27, No. 1, Jan. 2007, pp. 103-106, Hebei University, Baoding City, Hebei Province, China.

* cited by examiner

FIG. 3

| NUMBER | PRESENT/ABSENT | PRIORITY LEVEL |
|---|---|---|
| 1 | ABSENT | |
| 2 | ABSENT | |
| 3 | PRESENT | |
| 4 | PRESENT | 1 |
| 5 | ABSENT | |
| 6 | PRESENT | |
| 7 | PRESENT | |
| 8 | PRESENT | 2 |
| 9 | PRESENT | |

MACHINE TOOL SYSTEM

CROSS-REFERENCE TO RELATED APPLICATION(S)

This is a National Stage Entry into the United States Patent and Trademark Office from International Patent Application No. PCT/JP2021/025878, filed on Jul. 9, 2021, which relies on and claims priority to Japanese Patent Application No. JP 2020-120586, filed on Jul. 14, 2020, the entire contents of both of which are incorporated herein by reference.

FIELD OF THE INVENTION

The present disclosure relates to machine tool systems.

BACKGROUND OF THE INVENTION

A known machine tool machines a workpiece in accordance with a production schedule (for example, see PCT International Publication No. WO 2018/138870).

Priority levels for machining workpieces are preliminarily stored in the production schedule, and if a workpiece cannot be machined in accordance with the production schedule, a machining process is performed starting from a workpiece at the next highest priority level.

A known machining system is provided with a tracking file for managing the movement of a workpiece (for example, see Japanese Unexamined Patent Application, Publication No. Sho 63-163904).

Editing, including moving, deleting, and adding, of data in the tracking file is possible. Thus, the machining sequence in the tracking file can be changed, and a cut-in process involving inserting a workpiece in the middle of a process is possible.

SUMMARY OF THE INVENTION

An aspect of the present disclosure provides a machine tool system including a schedule storage unit that stores machining schedule information containing a machining sequence of a plurality of workpieces, and a priority-level setting unit that allows a user to designate any of the workpieces in the machining schedule information stored in the schedule storage unit and to set a priority level for the designated workpiece. The workpiece for which the priority level is set by the priority-level setting unit is machined in accordance with the priority level, and the workpiece for which the priority level is not set is machined in accordance with the machining sequence after the workpiece for which the priority level is set is machined.

BRIEF DESCRIPTION OF THE DRAWINGS

FIG. 3 illustrates an example of machining schedule information used in the machine tool system in FIG. 1.

DESCRIPTION OF EMBODIMENT(S) OF THE INVENTION

A machine tool system 1 according to an embodiment of the present disclosure will be described below with reference to the drawings.

Figure 1:
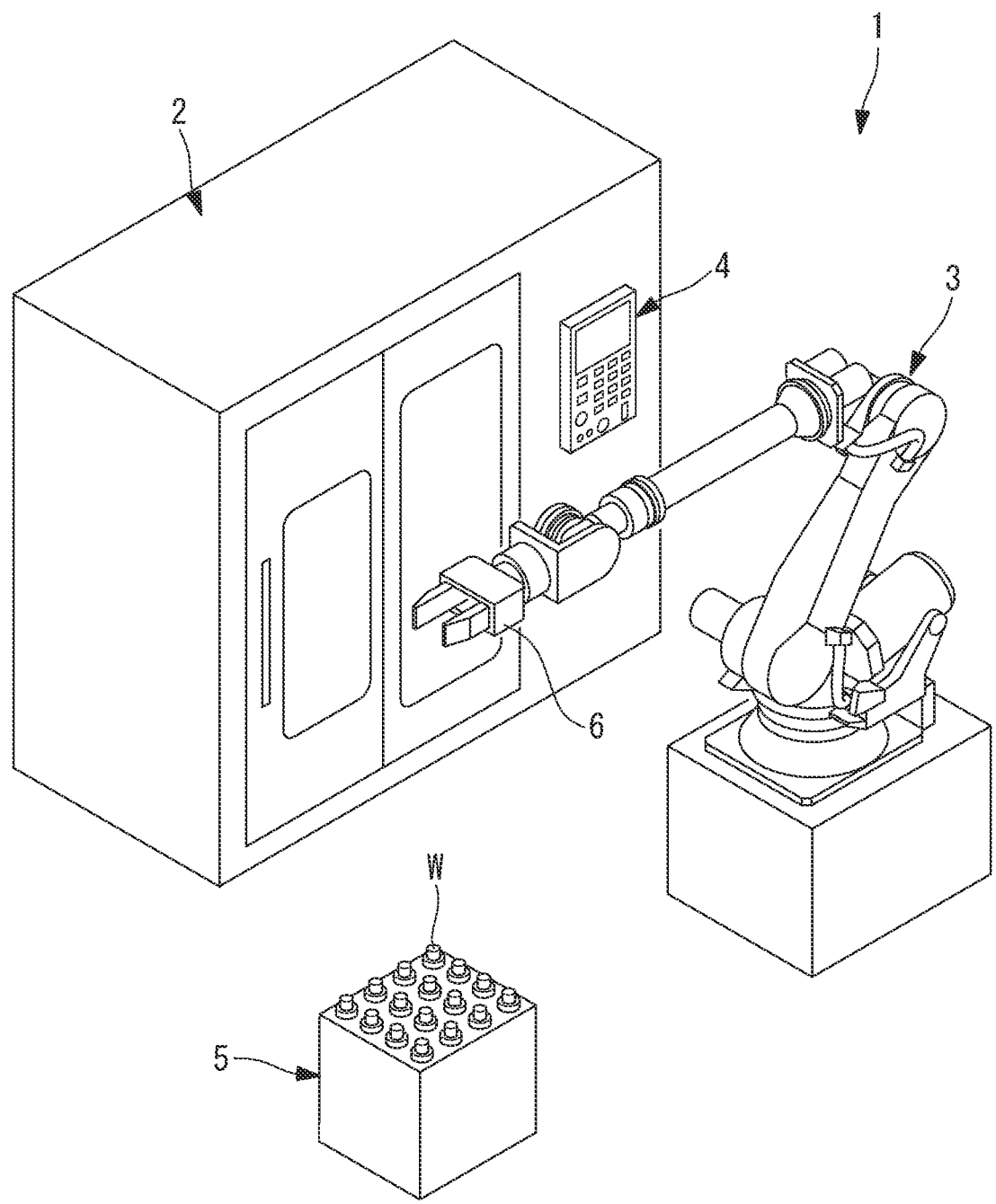
FIG. 1 illustrates the overall configuration of a machine tool system according to an embodiment of the present disclosure.
Figure 2:
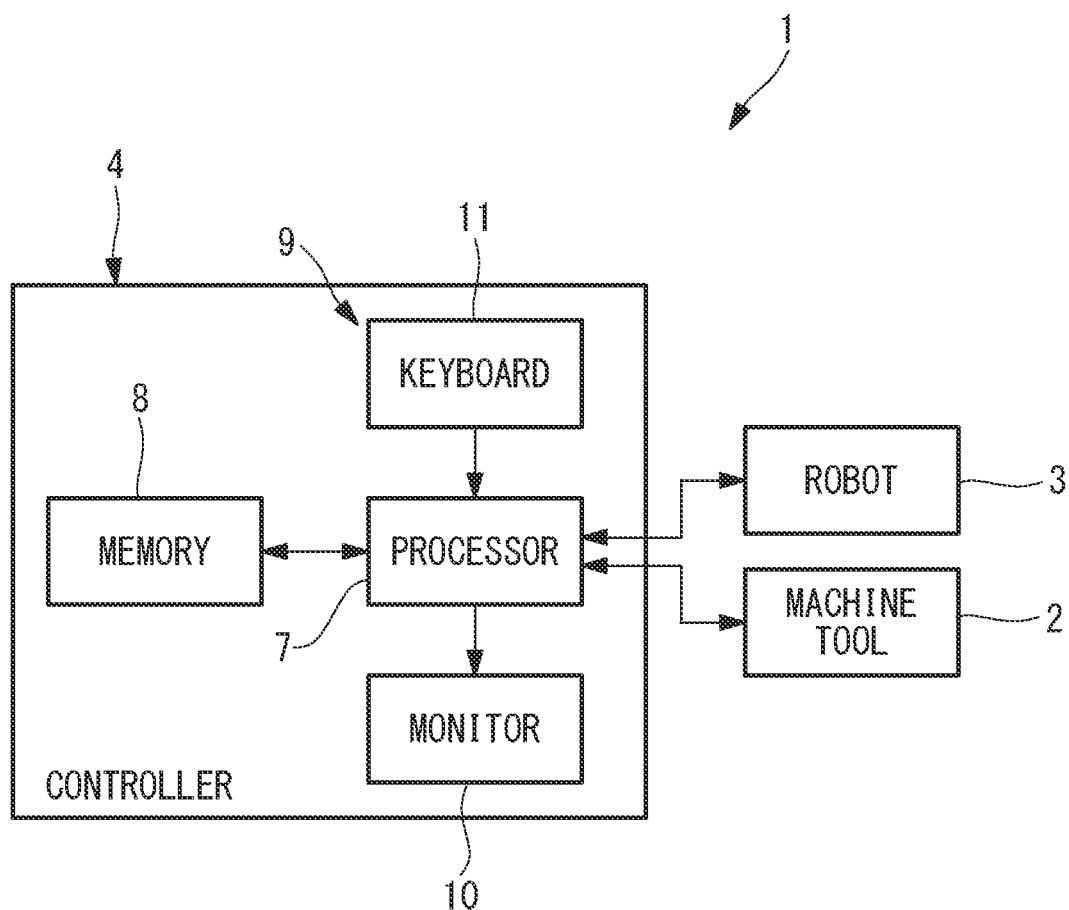
FIG. 2 is a block diagram illustrating the machine tool system in FIG. 1.

As shown in FIGS. 1 and 2, the machine tool system 1 according to this embodiment includes a machine tool 2 for machining a workpiece W, a robot 3 that loads and unloads a workpiece W into and from the machine tool 2, and a controller 4 that controls the machine tool 2 and the robot 3. In FIG. 1, reference sign 5 denotes a work stocker that accommodates a plurality of workpieces W to be fed to the machine tool 2.

The work stocker 5 accommodates, for example, nine workpieces W in a 3×3 arrangement on the upper surface thereof. The workpieces W on the work stocker 5 are given numbers (identification information) from #1 to #9 depending on their positions on the work stocker 5.

The robot 3 is a six-axis articulated robot in the example shown in FIG. 1. The robot 3 has, at the distal end thereof, a hand 6 capable of gripping a workpiece W. Alternatively, the robot 3 may have an arbitrary structure.

As shown in FIG. 2, the controller 4 includes at least one processor 7, a memory (schedule storage unit) 8 that stores machining schedule information, and a priority-level setting unit 9 that allows a user to designate any of the workpieces W in the machining schedule information stored in the memory 8 and to set a priority level of the designated workpiece W.

The priority-level setting unit 9 includes a monitor 10 and a keyboard (input device) 11.

For example, as shown in FIG. 3, the machining schedule information includes the number of each workpiece W, the presence or absence of the workpiece W on the work stocker 5, the state of the workpiece W, and the priority level thereof. In this embodiment, the numbers of the workpieces W directly indicate the machining sequence of the workpieces W.

The number of each workpiece W is associated with information indicating the presence or absence of the workpiece W and the priority level thereof.

For example, the presence or absence of each workpiece W is input to the machining schedule information by the user when the workpiece W is set on the work stocker 5. If the workpiece W is present on the work stocker 5, the workpiece W is set as "present" in the machining schedule information. When the workpiece W is undergoing or has completely undergone a machining process, the workpiece W is set as "absent" in the machining schedule information.

With regard to the priority level, for example, the user may input a numerical value, where appropriate. For example, when the #4 workpiece W is set to the first priority level and the #8 workpiece W is set to the second priority level, the priority level corresponding to the #4 workpiece W becomes 1, and the priority level corresponding to the #8 workpiece W becomes 2, as shown in FIG. 3.

Figure 4:
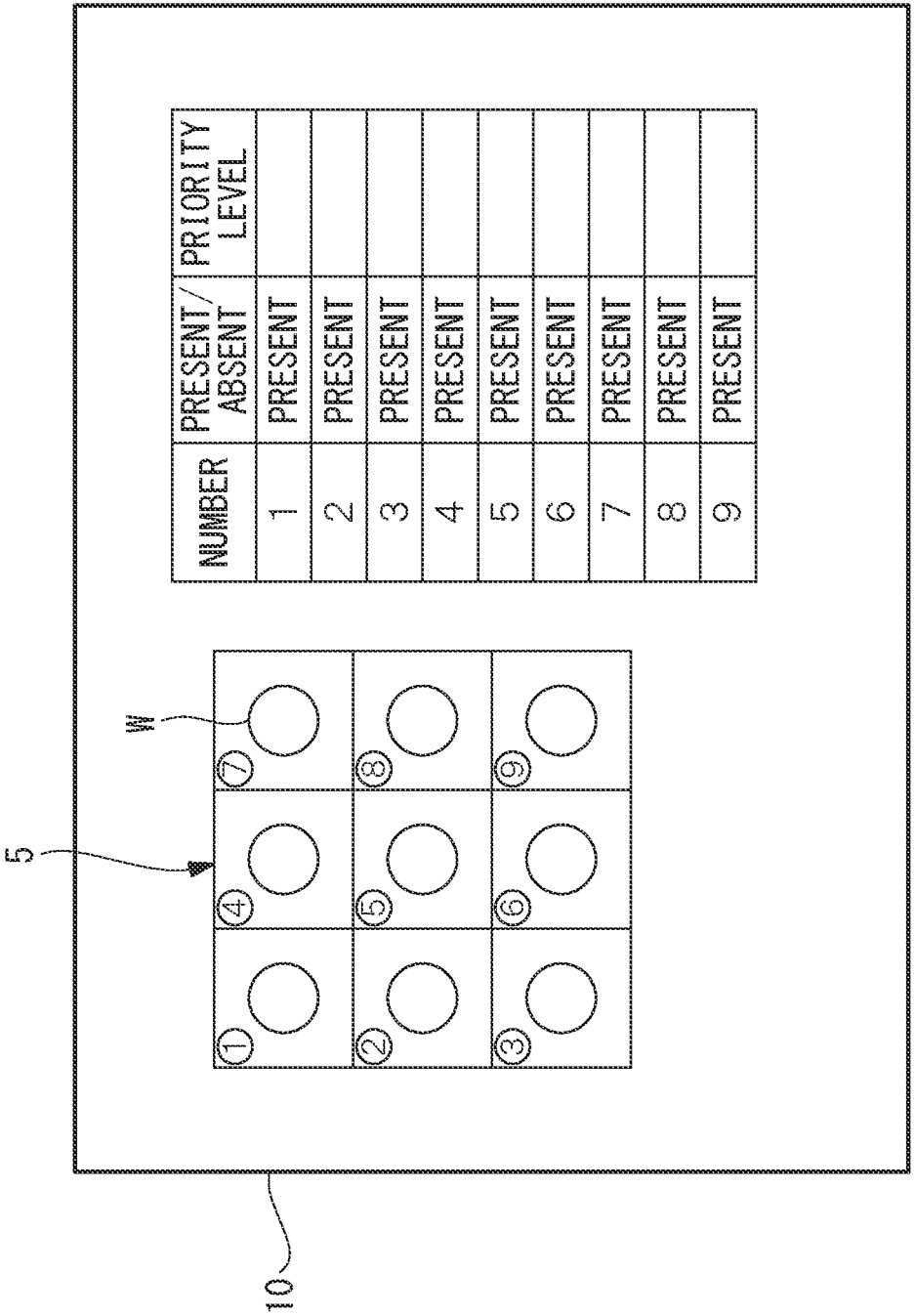
FIG. 4 illustrates a display example of a monitor in an initial state in the machine tool system in FIG. 1.

The controller 4 displays, for example, the arrangement of the workpieces W on the work stocker 5 and the machining schedule information on the monitor 10, as shown in FIG. 4. In an initial state prior to the start of a machining process, the workpieces W are all arranged on the work stocker 5 and priority levels are not set, as shown in FIG. 4.

At an arbitrary time point prior to the start of a machining process or during a machining process of a workpiece W, if there is a workpiece W for which the user desires to advance the machining sequence among unmachined workpieces W, the user may use the keyboard 11 to designate the number of the corresponding workpiece W and input a numerical value for the priority level thereof. When the priority level is input, the controller 4 updates the machining schedule information stored in the memory 8 to machining schedule information to which the input priority level has been added.

The controller 4 confirms whether or not priority levels are set in the machining schedule information stored in the memory 8 when a machining process of each workpiece W is to be started. If priority levels are not set, the workpieces W are machined in the machining sequence based on the numerical order of the workpieces W. On the other hand, if priority levels are set, the workpieces W are machined in accordance with the priority levels. After all the workpieces W with the set priority levels have been machined, the workpieces W for which priority levels are not set are machined in the machining sequence based on the numerical order of the workpieces W.

Figure 5:
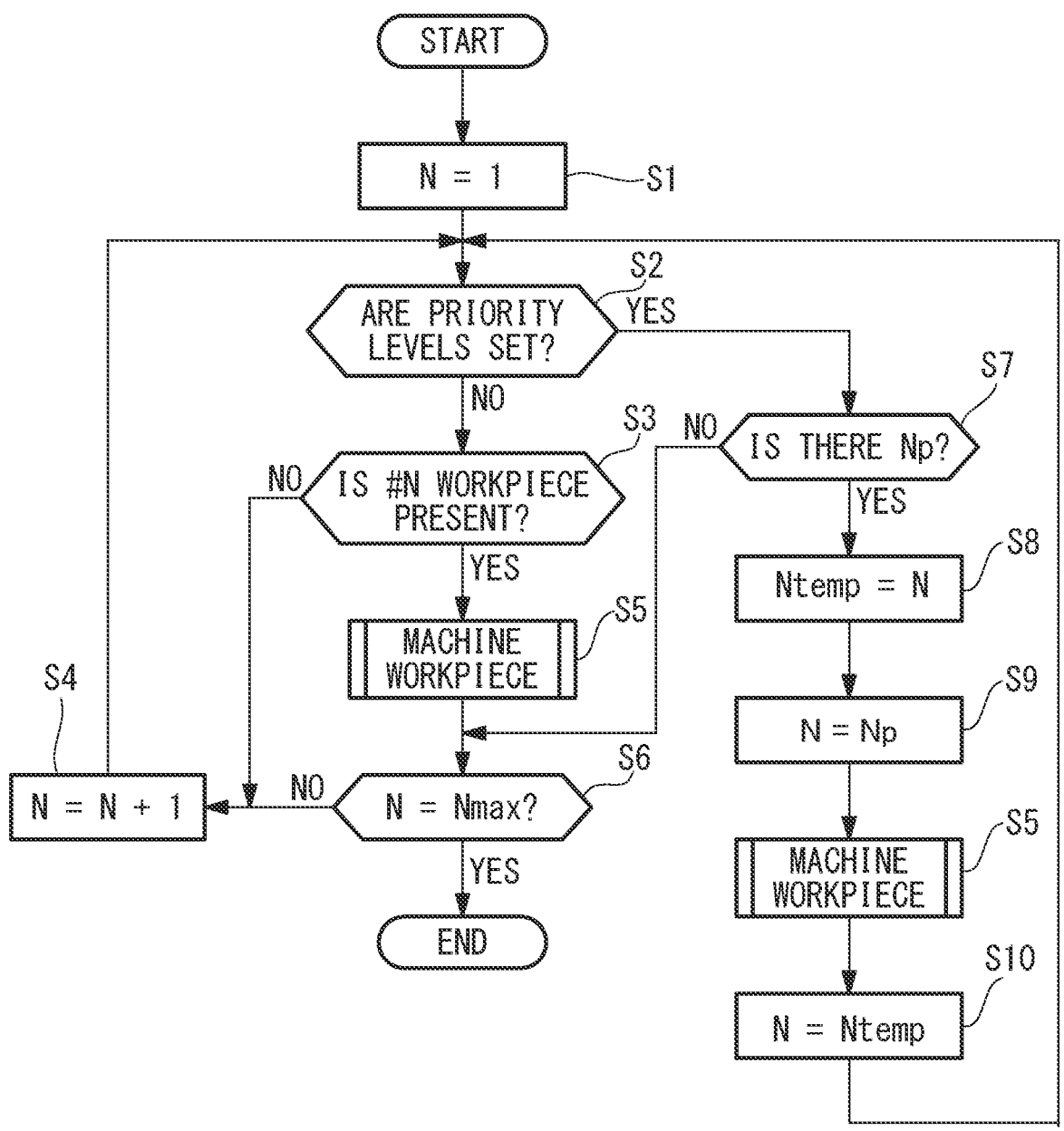
FIG. 5 is a flowchart explaining the operation of the machine tool system in FIG. 1.

More specifically, as shown in FIG. 5, the controller 4 initializes the workpiece number N to N=1 (step S1). Then, prior to the start of a machining process to be performed on the #N workpiece W, the controller 4 causes the processor 7 to read the machining schedule information from the memory 8 and confirms whether or not priority levels are set (step S2). If priority levels are not set, it is determined whether the #N workpiece W is present or absent (step S3).

If the #N workpiece W is absent, the number N is incremented (step S4), and the process from step S2 is repeated.

If the #N workpiece W is present, a machining process is performed on the workpiece W (step S5).

In the initial state in FIG. 4, priority levels are not set, and all the workpieces W are present on the work stocker 5. Therefore, a machining process is performed on the #N workpiece W (step S5).

Figure 6:
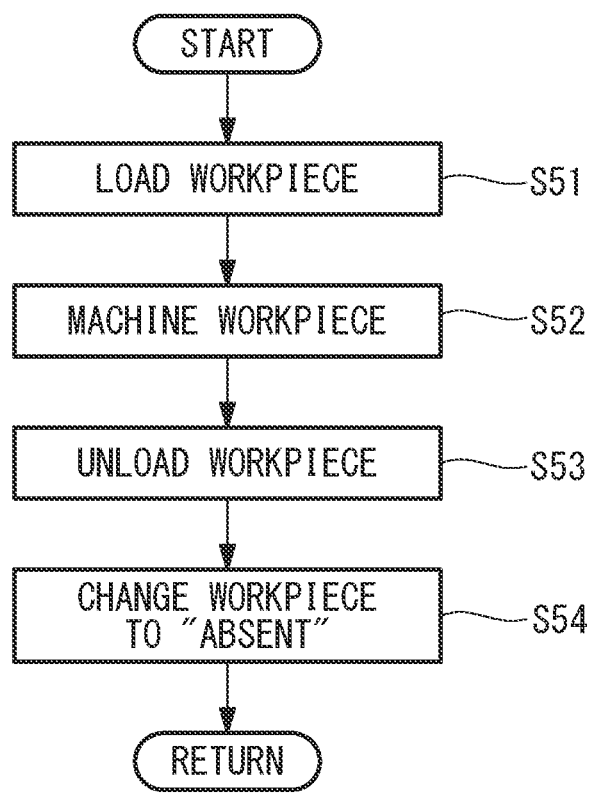
FIG. 6 is a flowchart explaining a machining process routine of a workpiece in the flowchart in FIG. 5.

As shown in FIG. 6, in the machining process of the workpiece W in step S5, the controller 4 controls the robot 3 to grip the #N workpiece W on the work stocker 5 and load the #N workpiece W into the machine tool 2 (step S51).

In the state where the workpiece W is loaded into the machine tool 2, the controller 4 controls the machine tool 2 to machine the workpiece W (step S52).

Figure 7:
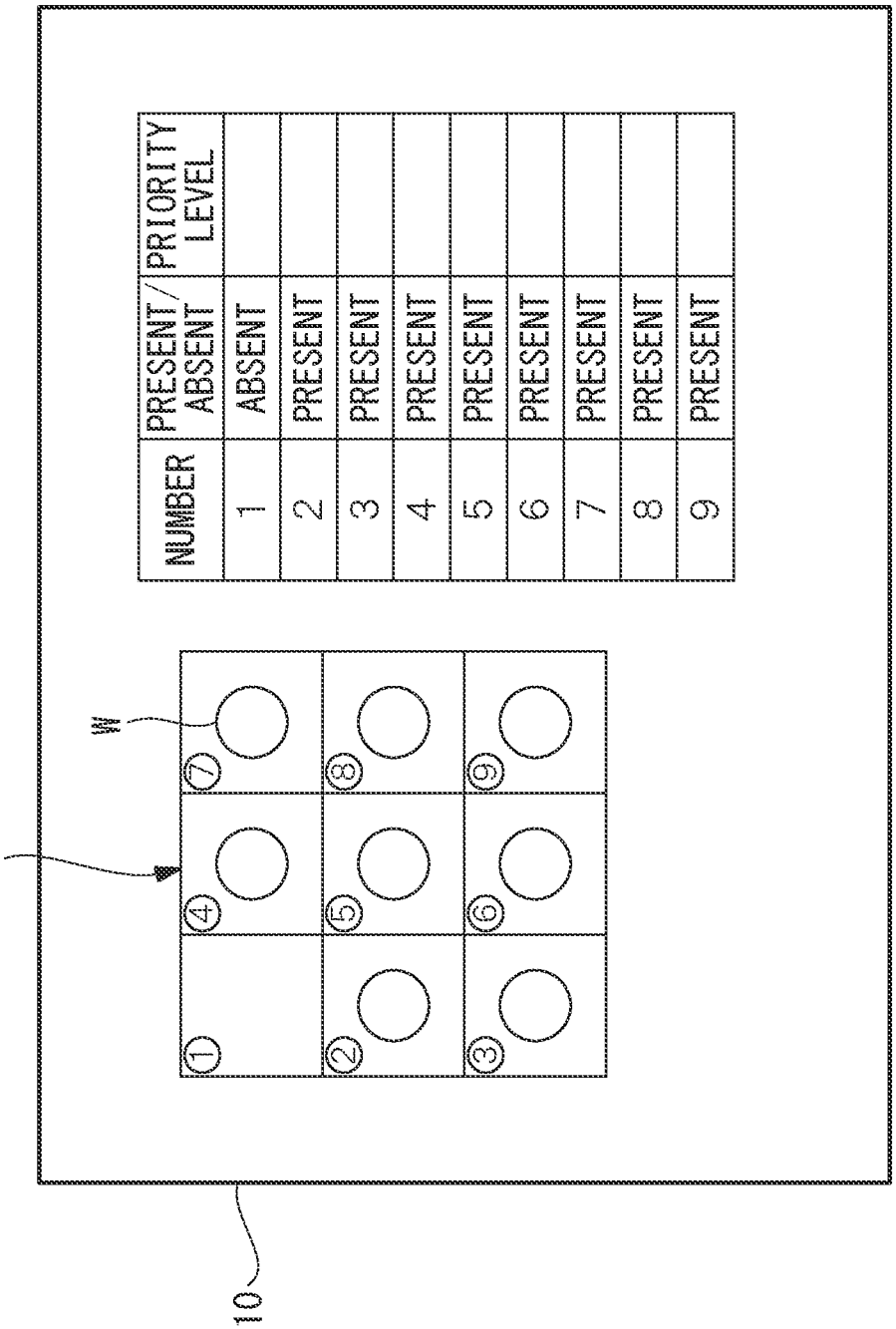
FIG. 7 illustrates a display example of the monitor in a state where a #1 workpiece is undergoing or has completely undergone a machining process from the state in FIG. 4.

When the machining process is completed, the controller 4 controls the robot 3 to unload the machined workpiece W from the machine tool 2 (step S53). Subsequently, the information indicating the presence or absence of the #N workpiece W is changed to "absent" (step S54). Accordingly, the display on the monitor 10 is changed, as shown in FIG. 7.

When the machining process of the workpiece W is completed, the controller 4 determines whether or not all the workpieces W have been machined (i.e., whether or not the number N of the workpiece W is a maximum value Nmax) (step S6). If not, the process proceeds to step S4 where the number N is incremented to 2, and then returns to step S2.

Figure 8:
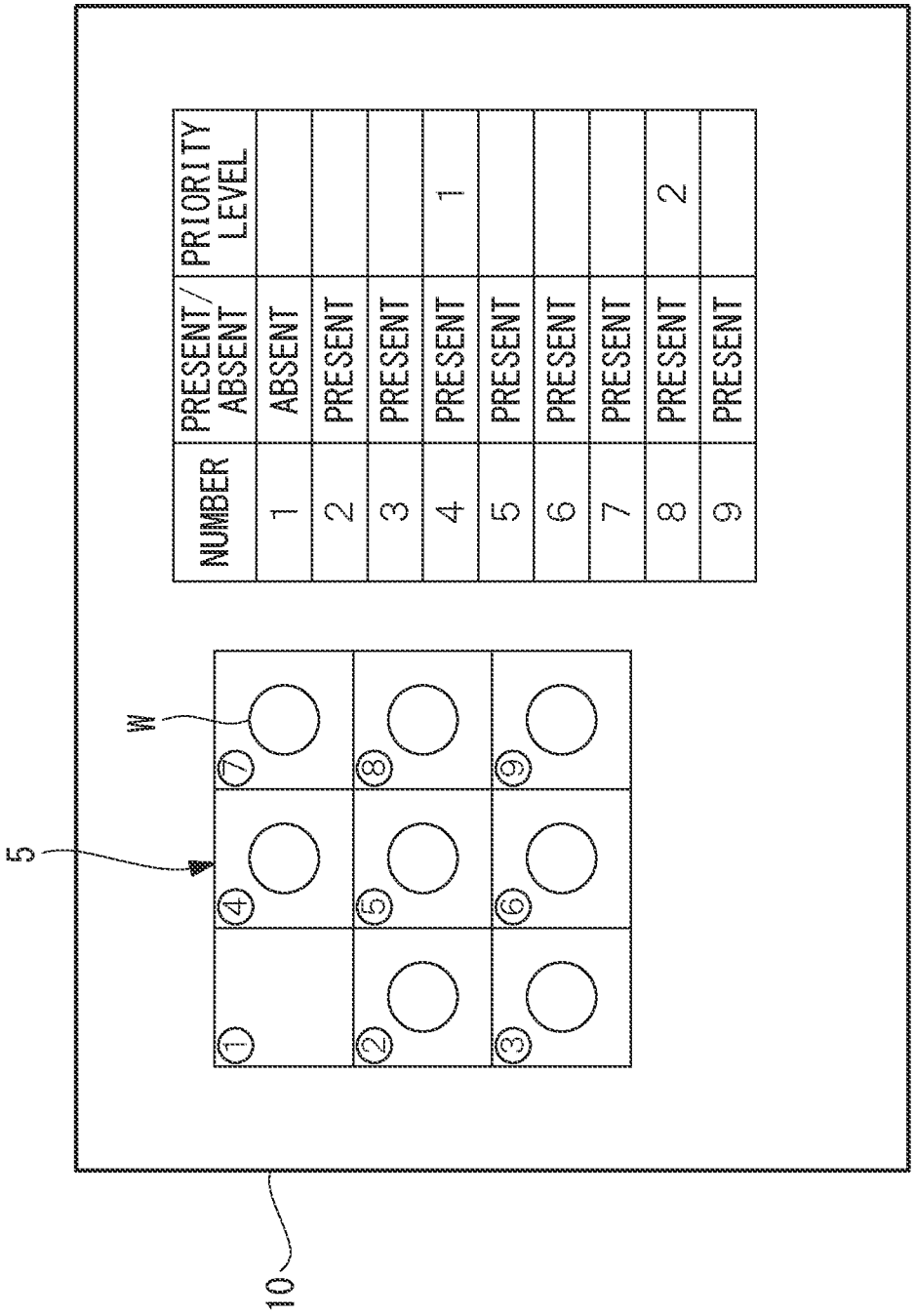
FIG. 8 illustrates a display example of the monitor in a state where priority levels are set from the state in FIG. 7.

The user is allowed to input a priority level at an arbitrary time point. For example, in order to input a priority level in the display state of the monitor 10 shown in FIG. 7, the number of an unmachined workpiece W present on the work stocker 5 is designated by operating the keyboard 11, and a priority level is input. Accordingly, for example, as shown in FIG. 8, the machining schedule information is changed. With regard to the number of a workpiece W not present on the work stocker 5, the designation of a priority level may be prohibited.

If priority levels are set when the process returns to step S2, a search for the number Np of an unmachined workpiece W at a higher priority level, that is, an unmachined workpiece W with the smallest numerical value for the priority level, is performed (step S7).

For example, in the case of FIG. 8, a search for "#4", as the number Np, at the first priority level is performed, so that the workpiece number N(=2) is temporarily saved as Ntemp (step S8) and the workpiece number N is replaced with the retrieved number Np (=4) (step S9). In this state, the machining process of the workpiece W in FIG. 6 is performed (step S5).

Figure 9:
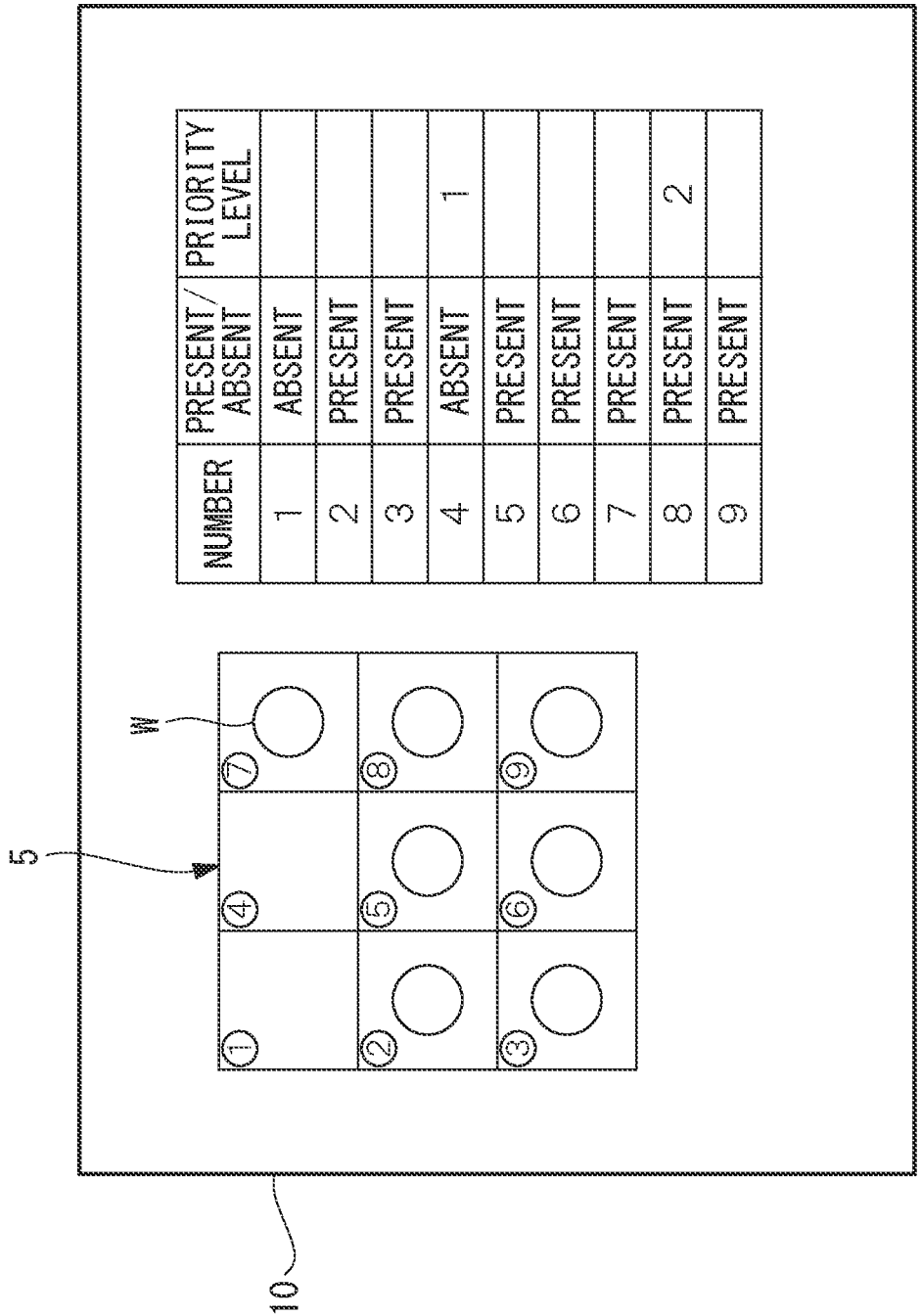
FIG. 9 illustrates a display example of the monitor in a state where a workpiece at the first priority level in FIG. 7 is machined prior to #2 and #3 workpieces.

When the machining process of the #4 workpiece W is completed, the controller 4 sets the saved Ntemp (=2) back to the workpiece number N (step S10). Then, the controller 4 changes the display of the monitor 10, as shown in FIG. 9, and repeats the process from step S2. When the process returns to step S2, the workpiece W that is set at a higher priority level and that is unmachined is "#8" set at the second priority level, so that the workpiece number N(=2) is temporarily saved as Ntemp (step S8), and the workpiece number N is replaced with the retrieved number Np (=8) (step S9). In this state, the machining process of the workpiece W in FIG. 6 is performed (step S5).

Figure 10:
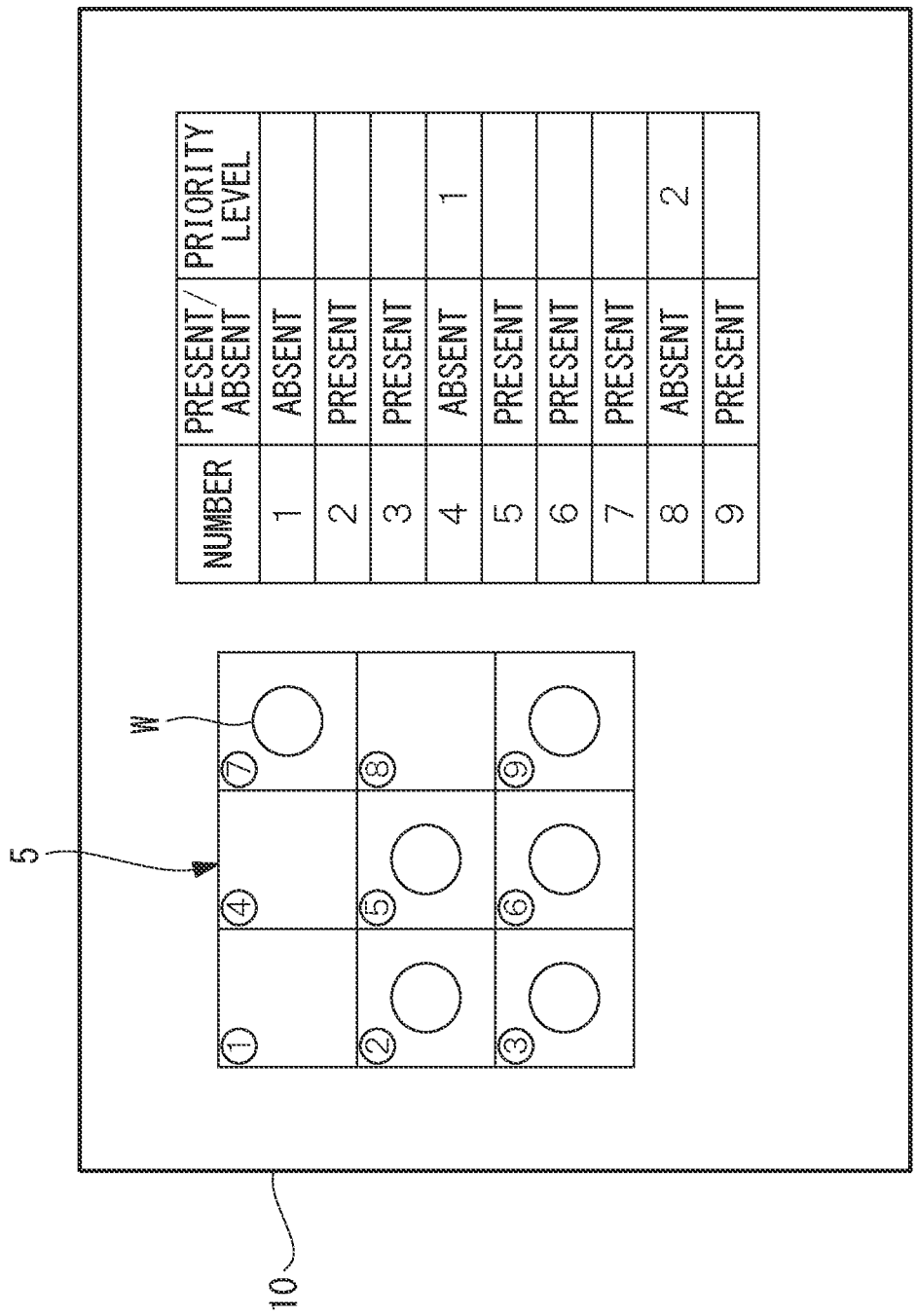
FIG. 10 illustrates a display example of the monitor in a state where a workpiece at the second priority level in FIG. 7 is machined prior to #5 to #7 workpieces.

When the machining process of the #8 workpiece W is completed, the controller 4 sets the saved Ntemp (=2) back to the workpiece number N (step S10). Then, the controller 4 changes the display of the monitor 10, as shown in FIG. 10, and repeats the process from step S2. When the process returns to step S2, there is no unmachined workpiece W with a set priority level. Thus, the process proceeds to step S3 to determine whether the #N(=2) workpiece W is present or absent, and the #2 workpiece W is machined. Subsequently, the remaining workpieces W are machined in the following sequence: N=3, 5, 6, 7, 9.

Accordingly, in the machine tool system 1 according to this embodiment, when priority levels are not set, the workpieces W are sequentially machined in accordance with the machining sequence in the preliminarily-set machining schedule information. On the other hand, when priority levels are set for unmachined workpieces W, since it is determined whether or not priority levels have been set before the start of a machining process of each workpiece W, workpieces W for which priority levels are set afterwards are machined with priority.

Specifically, without having to preliminarily set priority levels in the machining schedule information before the start of a machining process of all the workpieces W, the priority levels can be set afterwards for unmachined workpieces W after the start of the machining process of each workpiece W, and such unmachined workpieces W can be machined with priority. In this case, since the priority levels are set separately from the machining sequence preliminarily set in the machining schedule information, it is not necessary to edit the set machining sequence. This is advantageous in that the machining sequence is easily changeable within a short period of time.

In particular, in a case where there are a plurality of types of workpieces W, if a workpiece W at the back of the machining sequence suddenly needs to be machined with priority after the start of a machining process of any of the workpieces W, the machining sequence is easily changeable within a short period of time.

As an alternative to this embodiment in which nine workpieces W are arranged in a 3×3 arrangement on the work stocker 5, the number and the arrangement of the workpieces W may be set in an arbitrary manner.

The machined workpieces W are not returned to their original positions on the work stocker 5 so that the user can determine the priority-level-settable workpieces W by using the information about the presence or absence of the workpieces W. Alternatively, the machined workpieces W may be returned to their original positions on the work stocker 5. In this case, information about whether the workpieces W are unmachined or machined may be displayed in place of the information about the presence or absence of the workpieces W.

Furthermore, although the arrangement of the workpieces W on the work stocker 5 and the machining schedule information are displayed on the monitor 10 in this embodiment, the embodiment is not limited to this.

The invention claimed is:

1. A machine tool system comprising:
   at least one processor configured to machine a plurality of workpieces in accordance with a preliminarily-set machining sequence; and
   an input device configured to receive, while the plurality of workpieces are machined in accordance with the preliminarily-set machining sequence, an input of newly adding a priority level to any of the plurality of workpieces separately from the preliminarily-set machining sequence,
   wherein the processor is configured to continue to machine the plurality of workpieces in accordance with the preliminarily-set machining sequence after a workpiece for which the priority level is added is machined.

2. The machine tool system according to claim 1, further comprising a memory, wherein the processor is configured to:
   in response to receiving the input by the input device, cause the memory to store priority-level information indicating the workpiece for which the priority level is added; and
   confirm whether or not the priority-level information is stored in the memory when machining is started for each of the plurality of workpieces.

* * * * *